United States Patent [19]
DePaolis

[11] Patent Number: 5,829,310
[45] Date of Patent: Nov. 3, 1998

[54] COLLAPSIBLE STEERING COLUMN

[75] Inventor: Dino DePaolis, Sterling Heights, Mich.

[73] Assignee: Chrysler Corporation, Auburn Hills, Mich.

[21] Appl. No.: 843,318

[22] Filed: Apr. 14, 1997

[51] Int. Cl.⁶ .................................................. B62D 1/16
[52] U.S. Cl. .............................................. 74/492; 74/493
[58] Field of Search ........................... 74/492, 491, 493; 280/777

[56] References Cited

U.S. PATENT DOCUMENTS

| | | | |
|---|---|---|---|
| 3,479,902 | 11/1969 | Okamoto | 74/492 |
| 4,572,022 | 2/1986 | Mettler | 74/492 |
| 5,259,818 | 11/1993 | Kachi et al. | 74/492 |
| 5,640,884 | 6/1997 | Fujiu et al. | 74/492 |
| 5,685,565 | 11/1997 | Schäfer et al. | 74/492 |
| 5,706,704 | 1/1998 | Riefe et al. | 74/492 |

*Primary Examiner*—Charles A. Marmor
*Assistant Examiner*—David Fenstermacher
*Attorney, Agent, or Firm*—Lawrence J. Shurupoff

[57] ABSTRACT

A collapsible steering column has a tubular outer steering column part and a tubular inner steering column part partially telescoped with one another. The untelescoped portion of the outer part has integral, flexibly resilient tabs extending across the inner end portion of the inner part to yieldably obstruct and retard the further telescoping of the parts and thereby absorb energy during collapse of the steering column in a frontal impact.

3 Claims, 2 Drawing Sheets

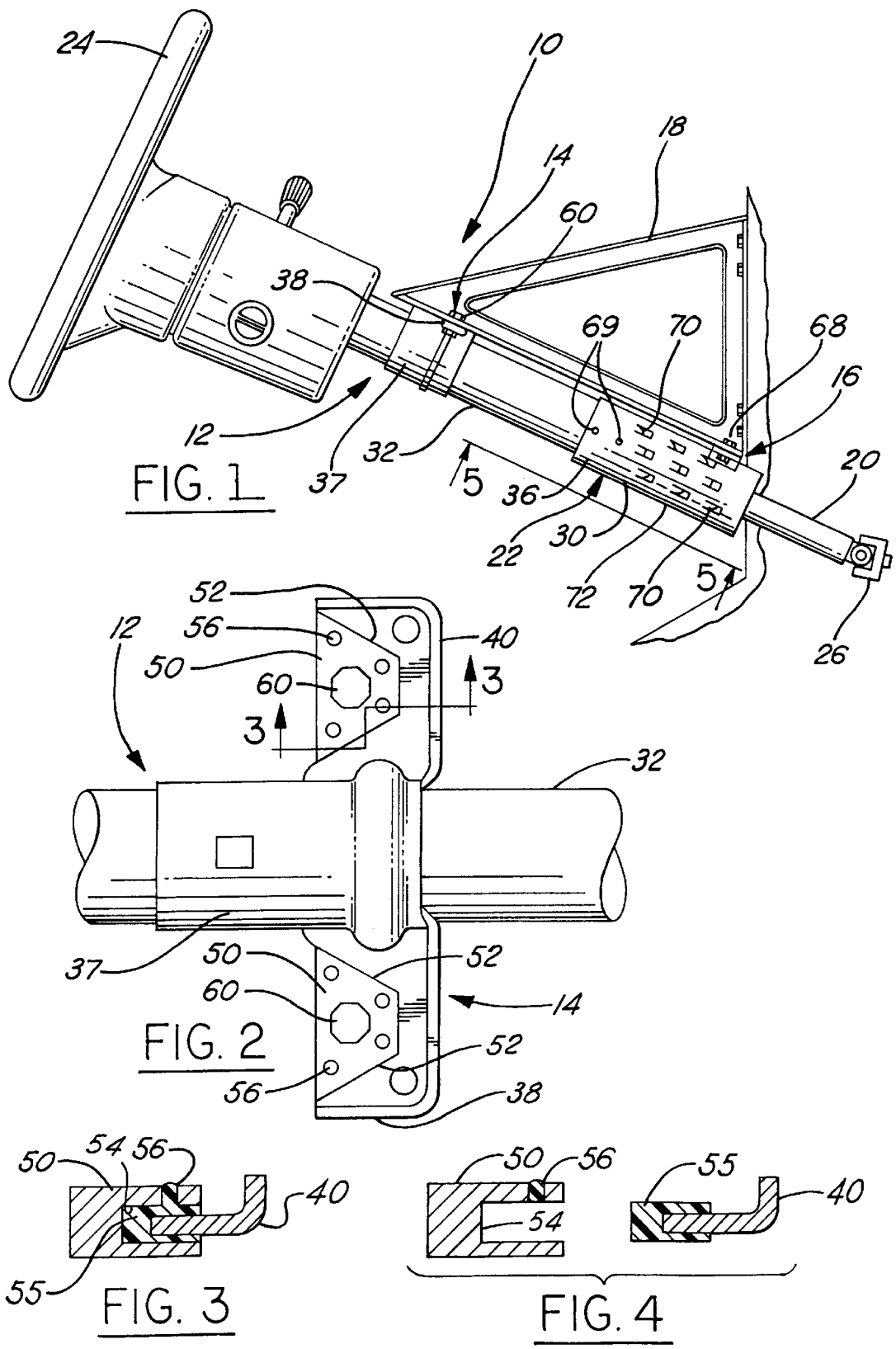

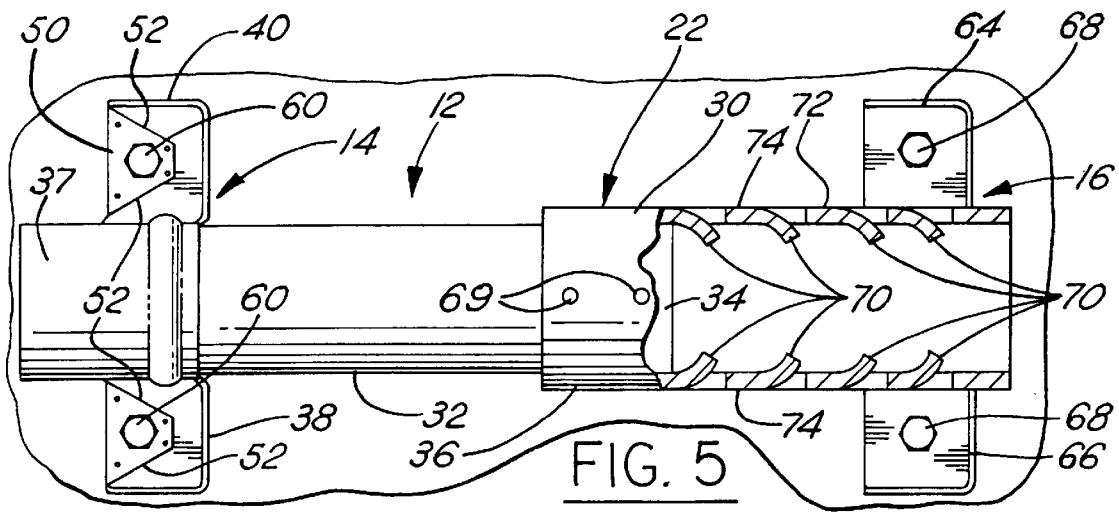
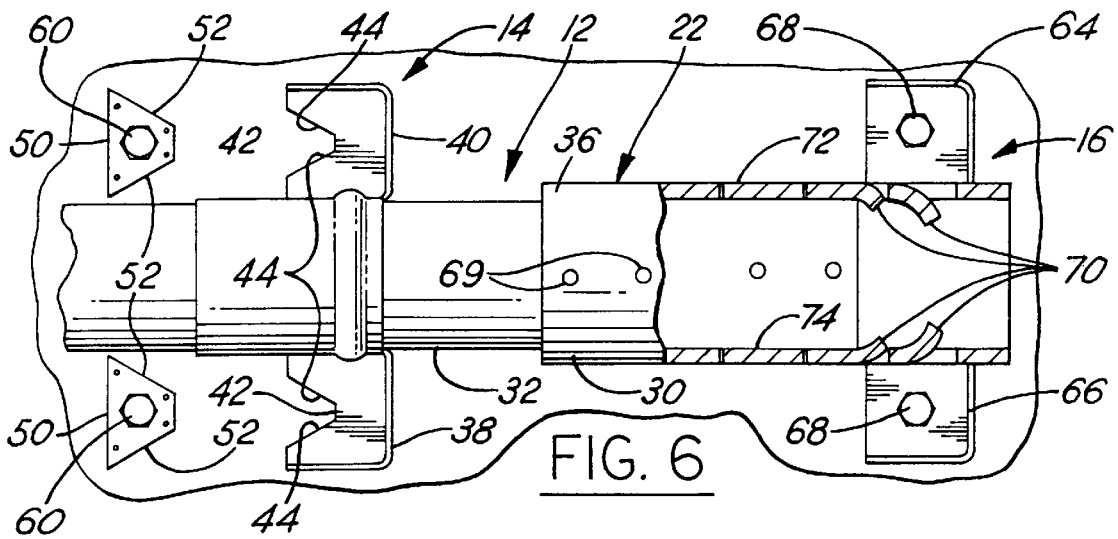
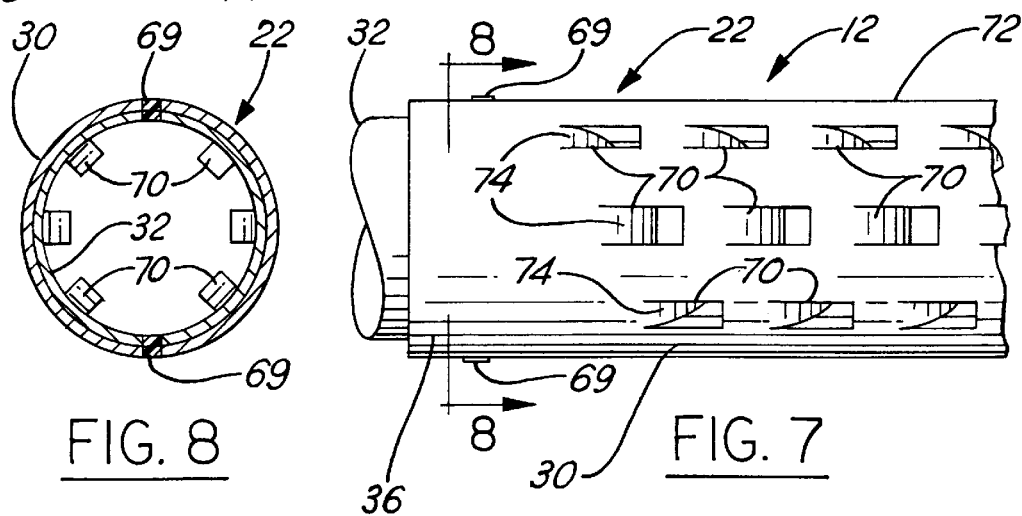

COLLAPSIBLE STEERING COLUMN

FIELD OF INVENTION

This invention relates generally to steering columns and more particularly to a collapsible steering column for an automotive vehicle.

BACKGROUND AND SUMMARY OF THE INVENTION

In a frontal impact caused, for example, by a head-on collision, the driver is often thrown forward against the steering wheel with great force. The result can be serious injury or death.

In accordance with the present invention, a collapsible steering column assembly is provided which is adapted to collapse under a predetermined force and gradually absorb energy to reduce the impact against the driver. The steering column assembly comprises an elongated steering column having a tubular outer steering column part and a tubular inner steering column part. The steering column parts are telescoped together and one of the parts is formed with flexibly resilient tabs to obstruct the further telescoping of the parts and thereby absorb energy during the collapse of the steering column in a frontal impact.

In the embodiment to be described, the tabs are integrally formed on the outer steering column part and extend generally radially inwardly. Preferably, each of the tabs has one end formed integral with the outer telescoping part and is inclined radially inwardly in a direction away from the telescoping portion of the inner part. Hence, when the steering column collapses, the inner telescoping part is forced against the tabs and cams them radially outwardly, but in the process, the tabs retard the further telescoping of the parts and absorb energy. The tabs are preferably arranged so that there is a progressive or sequential engagement. Hence, as the collapse of the steering column continues, additional tabs come into play.

One object of this invention is to provide a collapsible steering column having the foregoing features and capabilities.

Another object is to provide a collapsible steering column which is constructed of a relatively few simple parts and can be easily and inexpensively manufactured and assembled.

These and other objects, features and advantages of the invention will become more apparent as the following description proceeds, especially when considered with the accompanying drawings.

BRIEF DESCRIPTION OF THE DRAWINGS

FIG. 1 is a side elevational view of a collapsible steering column constructed in accordance with the invention.

FIG. 2 is a top plan view of a portion of FIG. 1, showing the upper support for the steering column.

FIG. 3 is a sectional view taken on the line 3—3 in FIG. 2.

FIG. 4 is a sectional view similar to FIG. 3 but showing the parts separated.

FIG. 5 is an enlarged fragmentary view with parts in section, taken on the line 5—5 in FIG. 1.

FIG. 6 is a view similar to FIG. 5 but shows the steering column in the process of collapsing.

FIG. 7 is a side view of a portion of the steering column.

FIG. 8 is a sectional view taken on the line 8—8 in FIG. 7.

DETAILED DESCRIPTION OF THE PREFERRED

Referring now more particularly to the drawings, the steering column assembly comprises an elongated steering column 12 which is adapted to extend lengthwise of a vehicle with an upward tilt from front to rear. The steering column 12 is supported by an upper support 14 and a lower support 16. The supports 14 and 16 secure the steering column to rigid vehicle support structure 18. The steering column 12 comprises a steering shaft 20 extending lengthwise within a tubular steering column jacket 22, with a steering wheel 24 at the upper end of the steering shaft and a universal joint 26 at the lower end thereof, leading to steering mechanism adapted to be connected to the wheels of the vehicle.

The steering column jacket 22 comprises an elongated tubular outer jacket part 30 axially aligned with an elongated tubular inner jacket part 32. The jacket parts are partially telescoped as shown. The jacket parts 30 and 32 are preferably of uniform circular cross-section and, in the normal operating condition, the inner end portion 34 of the inner part 32 is telescoped within the inner end portion 36 of the outer part 30.

The upper support 14 comprises sleeve 37 secured to the inner jacket part 32 having a pair of horizontal mounting plates 38 and 40 extending laterally outwardly from the inner jacket part. Each plate 38, 40 has a slot 42 which opens through the rear edge of the plate. The slots have side edges 44 which taper in a forward direction. Capsules 50 made of zinc or like material are flat wafer-like members with side edges 52 tapered at the same angle as the slots. The side edges 52 of the capsules have grooves 54 which receive the side edges 44 of the slots 42. The capsules 50 are adhered to the plates 38, 40 by a suitable adhesive 55, such as a heat-softenable plastic. If the adhesive is a heat-softenable plastic, it is introduced, in a heated, flowable state, into the space between the grooves and side edges of the plate through holes 56 in the capsules. When the adhesive cools, the capsules become bonded to the plate, but the bond, while strong enough to hold under normal driving conditions, will release or break loose upon a frontal impact of sufficient force to cause the steering column to collapse. The capsules 50 are secured to vehicle support structure 18 by nut and bolt assemblies 60.

The lower support 16 comprises a pair of horizontal mounting plates 64 and 66 extending laterally outwardly from the outer jacket part 30. The plates 64 and 66 are rigidly secured to the vehicle support structure 18 by nut and bolt assemblies 68.

Shear pins 69 interconnect the telescoping inner end portions of the jacket parts 30 and 32, but shear or break away upon initial collapse of the steering column.

The outer jacket part 30 is formed with a plurality of tabs 70. The tabs 70 are integral with the metal of the outer end portion 72 of the outer jacket part 30, that is, the portion of the outer jacket part which is not telescoped. The tabs are generally rectangular and elongated, and are formed by cutting the material of the jacket part 30 along three sides and then bending the tabs radially inwardly. The material of the jacket, and of the tabs, is steel or some other flexibly resilient material. Each tab has its rear end 74 integrally connected to the outer jacket part 30 and is inclined radially inwardly in a forward direction. This places the tabs in positions such that they will be contacted by the inner jacket part 32 upon a further telescoping of the steering column, as when a severe frontal impact occurs.

Preferably, the tabs are staggered so that they do not all engage at the same time during a steering column collapse. As seen in FIGS. 1 and 7, the tabs are arranged in several axially extending rows with the rows equally, circumferentially spaced from one another and the tabs in each row equally, axially spaced. The tabs in each row is staggered relative to the tabs in the adjacent rows. The purpose of the arrangement is such that there will be a progressive or sequential engagement of the tabs as the steering column collapses. For example, the tabs may be arranged such that initially one tab is engaged, then another, and then another, and so on until all the tabs have been engaged and bent out to the position as shown in FIG. 6 in which they are in the plane of the wall of the outer jacket part. It may be assumed that tabs are provided on the opposite side of the jacket part 30 from that shown in FIG. 7, in the same pattern as FIG. 7, but axially offset slightly so that one tab is engaged at a time during steering column collapse. Alternatively, the tabs may be engaged by twos, that is, initially two tabs are engaged, then another two, followed by another two and so on. This could be effected by the same pattern of tabs on the opposite side of the jacket part 30 as that shown in FIG. 7, with no axial offset. As a further alternative, the tabs may be arranged so that they are sequentially engaged three at a time, or four or more at a time.

In the event of a frontal impact severe enough to throw the driver forward against the steering wheel and cause collapse of the steering column, the inner jacket part 32 will telescope further into the outer jacket part 30 from the normal driving position of FIG. 5 to that of FIG. 6 and during such collapse engage the tabs 70 and bend them out into the plane of the wall of the outer jacket. Initially, of course, the shear pins 69 will shear to allow this further telescoping of the steering column to occur. The tabs, being formed of a resilient material, will resist the collapse of the steering column and absorb energy as the steering column continues to collapse. During the time that the steering column collapses, the inner end of the inner jacket part 32 engages the tabs progressively. The tabs in the arrangement shown in FIG. 7 are engaged one at a time, first one and then another and then another and so on so that there is a uniform and progressive resistance to steering column collapse, absorbing energy in the process. As previously stated, the tabs may be arranged so that they are sequentially engaged two at a time or three or more at a time as desired to control the collapse and absorption of energy.

What is claimed is:

1. A collapsible steering column assembly for an automotive vehicle, comprising an elongated steering column having an elongated, tubular, outer steering column part and an elongated, tubular, inner steering column part, said steering column parts being axially aligned and each having a first end portion and a second end portion, the first end portion of said inner steering column part extending axially within the first end portion of the outer steering column part in a partially telescoping relation of said parts, the second end portion of said outer steering column part having a plurality of flexibly resilient tabs extending across the inner end portion of said inner steering column part to yieldably obstruct the further telescoping of said parts and thereby absorb energy during collapse of the steering column in a frontal impact, each of said tabs having a first end and a second end and extending from said first end to said second end lengthwise of said outer steering column part, the first end of each of said tabs being closer to the first end portion of said outer steering column part than the second end thereof, the first end of each of said tabs being integrally connected to said outer steering column part, said integral connection constituting the sole connection of each of said tabs to said outer steering column part, and each of said tabs being inclined radially inwardly from the first end to the second end thereof.

2. A collapsible steering column assembly as defined in claim 1, wherein said tabs are arranged in a plurality of axially extending, equally circumferentially spaced apart rows, the tabs in each of said rows being equally axially spaced from each other and staggered relative to the tabs in the other of said rows.

3. A collapsible steering column assembly as defined in claim 2, and further including at least one shear pin interconnecting the telescoped inner end portions of said parts, said shear pin being adapted to shear upon initial collapse of the steering column.

\* \* \* \* \*